United States Patent [19]

Kato

[11] Patent Number: 5,228,738
[45] Date of Patent: Jul. 20, 1993

[54] WINDSHIELD GLASS MOLDING FOR VEHICLES

[75] Inventor: Katsuhisa Kato, Ibaragi, Japan

[73] Assignees: Tokiwa Chemical Industries, Co., Ltd., Chiba; System Technical Co., Ltd., Ibaragi, both of Japan

[21] Appl. No.: 896,965

[22] Filed: Jun. 11, 1992

[30] Foreign Application Priority Data

Sep. 26, 1991 [JP] Japan .................. 3-99468[U]
Oct. 21, 1991 [JP] Japan .................. 3-104893[U]

[51] Int. Cl.⁵ .................................................. B60R 13/06
[52] U.S. Cl. ......................................... 296/93; 52/400
[58] Field of Search .................... 296/93, 201; 52/400, 52/208

[56] References Cited

U.S. PATENT DOCUMENTS

| 4,757,659 | 7/1988 | Miyakawa et al. | 52/400 |
| 4,757,660 | 7/1988 | Miyakawa et al. | 52/400 |
| 4,984,839 | 1/1991 | Miyakawa et al. | 296/93 |
| 5,044,684 | 9/1991 | Yada | 296/93 |
| 5,114,206 | 5/1992 | Yada | 296/93 |

Primary Examiner—Robert R. Song
Attorney, Agent, or Firm—Wenderoth, Lind & Ponack

[57] ABSTRACT

A windshield glass molding for a vehicle is formed of synthetic resins and comprises a head molding provided with a head portion and a vertical leg extending downwardly from the head portion. The head portion is provided with an elongated hole in its under surface and with engaging projections on opposite sides of the elongated hole to form an engaging groove. The vertical leg is provided with a glass receiving tongue to form a glass insertion groove between the head portion and the glass receiving tongue. The glass molding also comprises an insertion leg portion which is provided with an insertion head for insertion into the engaging groove, a supporting leg having a rainwater guide portion formed in its side face, and a glass support piece having a glass insertion groove formed in its side surface. In the upper molding section of the glass molding, the edge of the glass panel is engaged in the glass insertion groove of the head molding, while in the right and left side molding sections of the glass molding, the insertion head of the insertion leg portion is inserted into the engaging recessed groove in the head molding, and the edge of the glass panel is inserted into the glass insertion groove of the insertion leg portion.

3 Claims, 5 Drawing Sheets

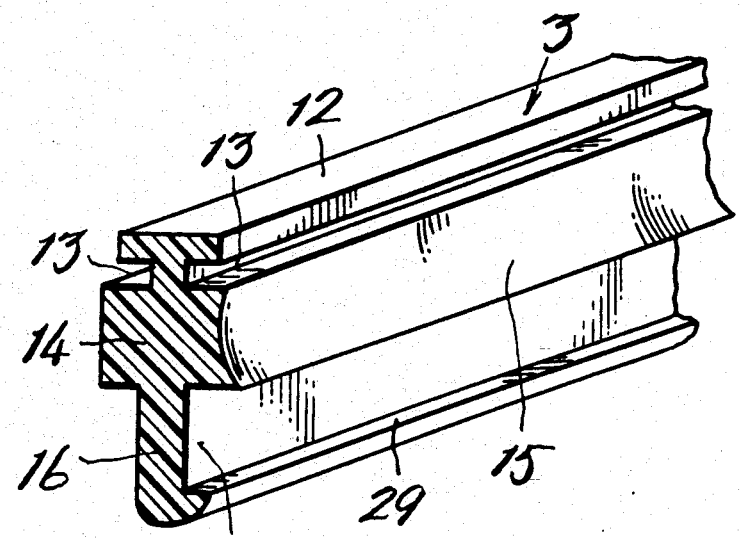
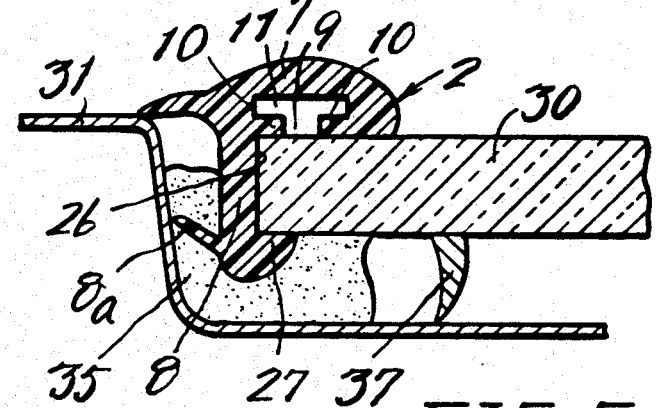
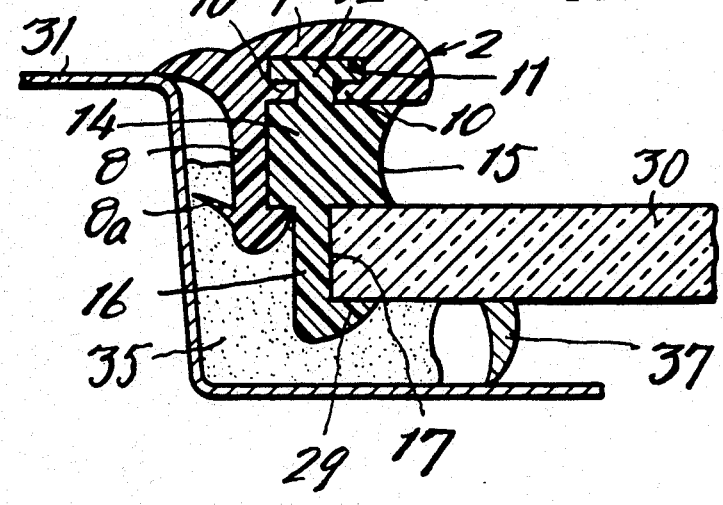

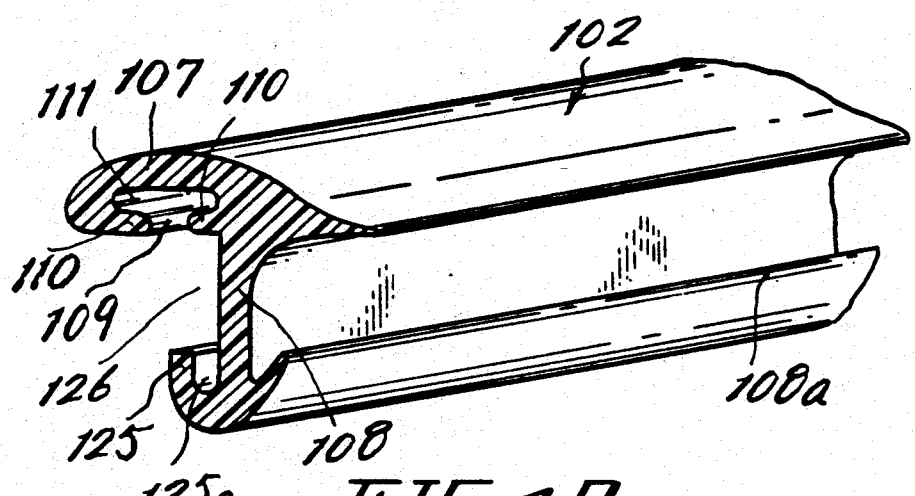
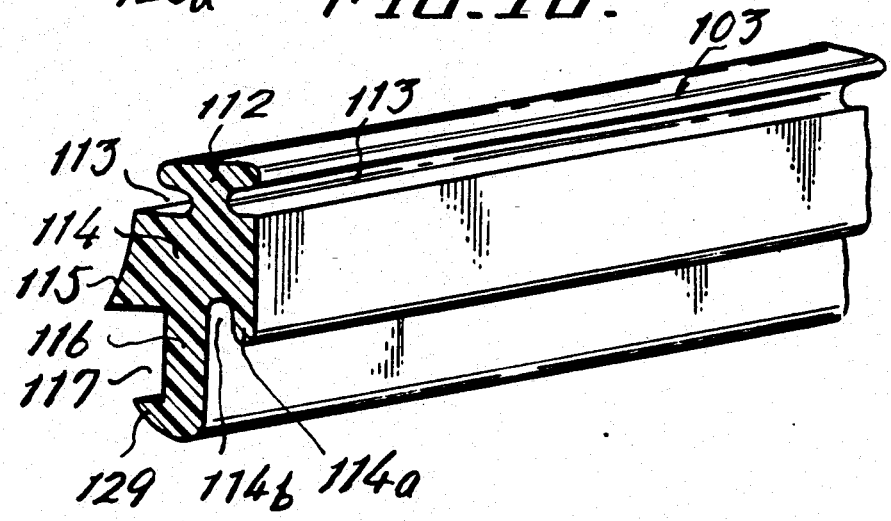
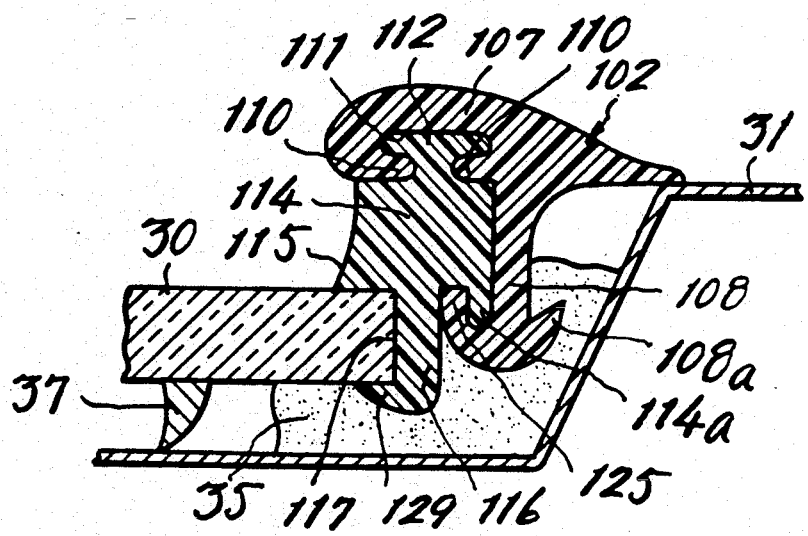

WINDSHIELD GLASS MOLDING FOR VEHICLES

BACKGROUND OF THE INVENTION

The present invention relates to a molding adapted to be interposed between the body panel and the glass panel of the windshield glass portion of various vehicles, and more particularly to a windshield glass molding for vehicles which is provided with a rainwater guide portion and is firmly secured in place.

Conventionally, this type of windshield glass molding is generally known wherein the molding is adapted to engage with the outer periphery of the glass panel and is fixed by adhesives in position on the body panel in engagement with the glass panel, and wherein the rainwater guide portion is formed between the glass panel and molding head to prevent the splash and ingress of rainwater to the driver's seat during driving, as described in U.S. Pat. No. 4,757,659 and U.S. Pat. No. 4,757,660.

The above-described conventional molding is provided with right and left side molding sections for the right and left sides of the windshield glass. These side molding sections have recesses for receiving the glass panel therein and have a rainwater guide portion above the recess to prevent the rainwater from splashing and ingressing into the driver's seat during driving.

However, a leg portion which is extended downwardly from the head substantially in a T-shaped configuration constitutes a common leg portion for the upper molding section and the right and left side molding sections. The leg portion must flex at the corner molding sections, and therefore the leg portion is made of a bendable material with a bendable cross-section. The windshield glass molding is projected above the glass panel at the right and left side molding sections. Consequently, the known windshield glass molding suffers such problems that it is deformed or moved under pressure imposed by the rain or the wind. This is particularly true because the molding is formed of synthetic resin materials which become softened when heated up to temperatures above 80° C. by the sun in the summer season. Consequently, the right and left side molding portions are freely moved or deformed.

Further, in the upper molding section, the leg portion of the molding is abutted at its lower top end against the body panel and such abutment can result in of the leg portion breakage. Thus, a cumbersome operation for cutting off the lower top end is required.

SUMMARY OF THE INVENTION

An object of the present invention is to solve the above-described problems, by providing a molding which is formed in a cross-sectional configuration which differs between the right and left side molding sections and the upper molding section of the glass panel, and wherein the glass panel is pinched (or engaged) easily by a head molding and the insertion leg portion having a rainwater guide portion and a recess for receiving the glass. The rainwater guide portion is formed to be durable, the need for a corner joint is eliminated to thereby realize an aesthetically attractive appearance, and the insertion leg portion may be suitably formed from rigid and heat-resistant materials for the right and left side molding sections.

Another object is to provide a molding which can prevent detachment of the upper molding decorative head portion from the lower insertion leg portion by ensuring a firm engagement between them.

A further object is to provide a molding which may allow for insertion of a reinforcing implant strip formed in a configuration identical (i.e. complementary) with that of engaging groove when the strength of the groove for receiving the upper head molding is reduced.

The most preferred embodiments of the present invention will be described hereinbelow, with reference to the accompanying drawings.

BRIEF DESCRIPTION OF THE DRAWINGS

The accompanying drawings illustrate the preferred embodiments of the windshield glass molding for vehicles in accordance with the invention, wherein:

FIG. 3 is a perspective view of an insertion leg;

FIG. 4 is an enlarged cross-sectional view taken along line 4—4 in FIG. 1;

FIG. 5 is an enlarged cross-sectional view taken along line 5—5 in FIG. 1;

FIG. 9 is a perspective view showing a decorative head portion of a molding, according to an alternative embodiment;

FIG. 10 is a perspective view showing an alternative embodiment of an insertion leg portion;

FIG. 11 is an enlarged cross-sectional view similar to FIG. 5, but showing the alternative embodiment of FIGS. 9 and 10;

DETAILED DESCRIPTION OF THE INVENTION

Figure 1:
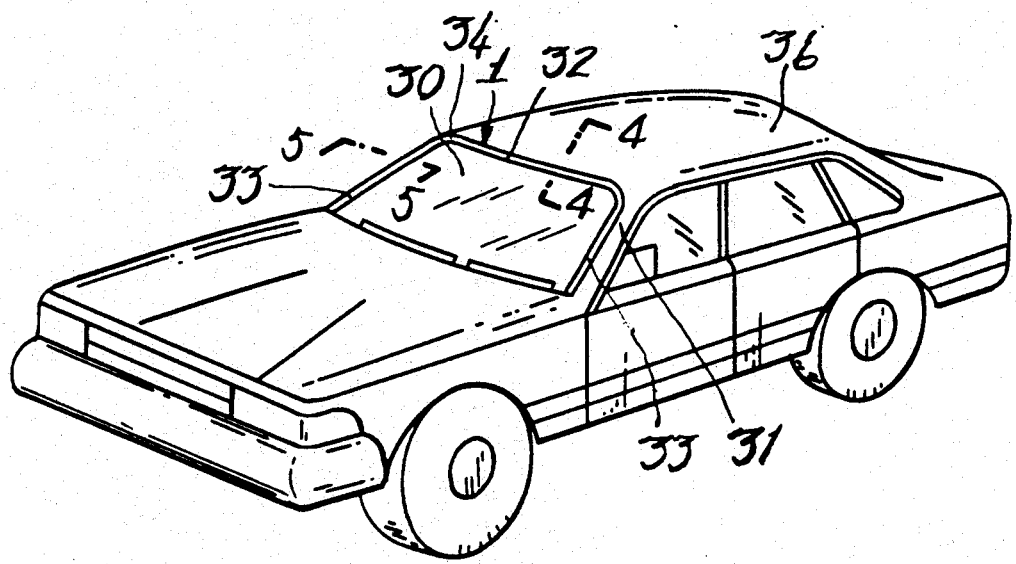
FIG. 1 is a perspective view of the glass molding in use on the windshield glass of a vehicle.

In the drawings, there is shown a molding body 1 to be interposed between a body panel 31 and a glass panel 30 of a vehicle 36 such as a motor vehicle.

The molding body 1 comprises a head molding 2 formed by extruding a synthetic resin in a longitudinal direction, and an insertion leg portion 3 to be engaged with and suspended from the head molding 2. The insertion leg portion 2 is provided with a rainwater guide portion 15 and a glass insertion groove 17 for receiving the glass panel. A corner insertion leg piece 5 is provided at the corner sections of the molding body.

Figure 2:
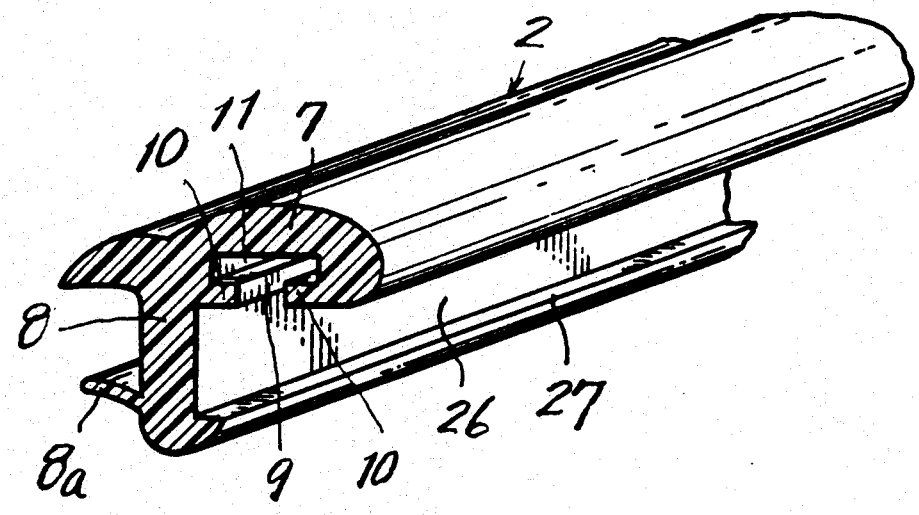
FIG. 2 is a perspective view of a decorative head portion of a molding, according to a first embodiment.
Figure 6:
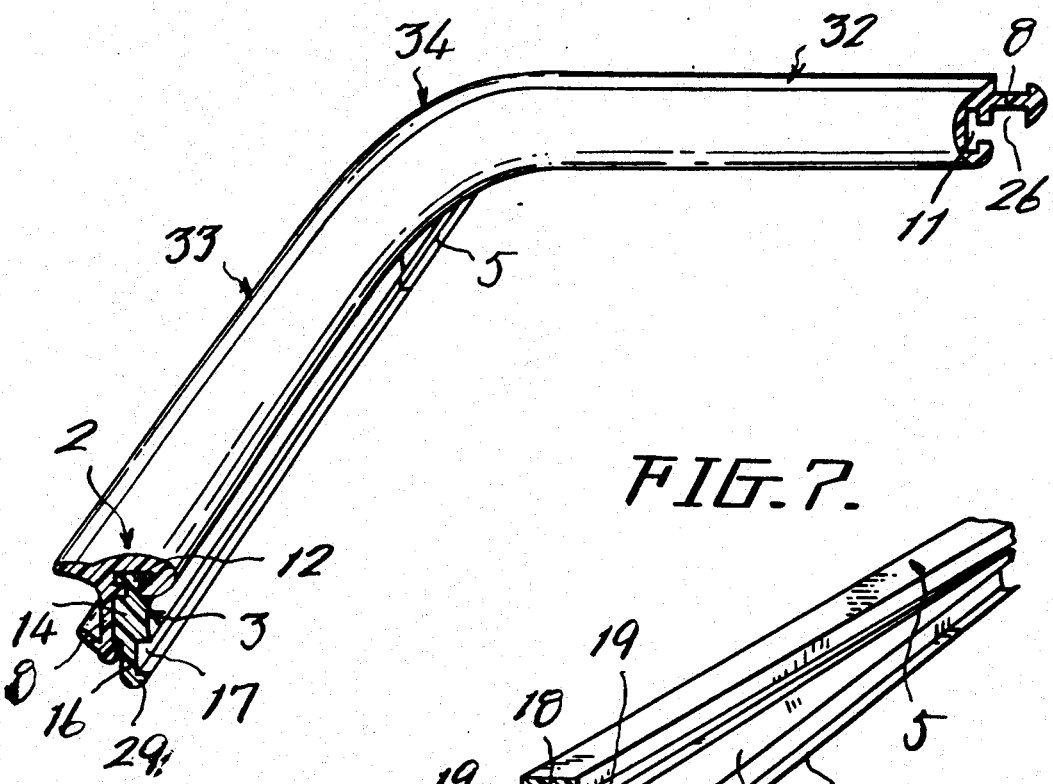
FIG. 6 is a perspective view showing a bent portion of the molding.

The head molding 2 is formed with an inverted generally L-shaped cross-sectional configuration and comprises a head portion 7 and a vertical leg 8. The head portion 7 is formed with opposing engaging projections 10 and has a longitudinally elongated hole 9 defined in the lower surface thereof as shown in FIG. 2. A substantially rectangular-shaped recessed engaging groove 11 is formed within the interior of the head portion 7 and is in communication with the elongated hole 9. The vertical leg 8 is formed at one side thereof with a glass insertion groove 26 between the head portion 7 and a glass receiving tongue 27 projecting from the lower end of the leg 8. Furthermore, the vertical leg 8 is provided on the other side thereof with an outwardly projecting auxiliary support piece 8a.

The insertion leg portion 3 as shown in FIG. 3 is formed with an insertion head 12 having a shape complementary with the rectangular-shaped engaging recess 11 defined in the head portion 7, and is received in the recess 11. Formed below the insertion head 12 ar recesses 13 into which the engaging projections 10 are inserted. Below the recesses 13, there is integrally formed a support leg 14 and a glass support piece 16. The rainwater guide portion 15 is formed in one side surface of the support leg 14, and has a substantially curved surface to allow the rainwater to flow downwardly therealong. At the lower end of the glass support piece 16, a glass receiving piece 29 is formed and is projected upwardly, and the glass insertion groove 17 is formed between the glass receiving piece 29 and the lower end of the support leg 14.

Figure 7:
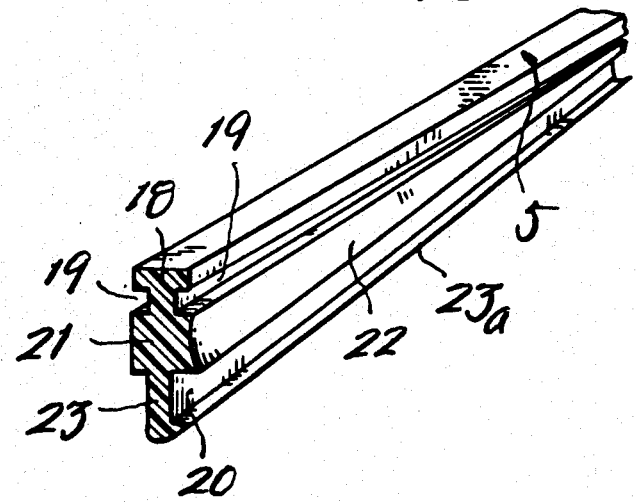
FIG. 7 is a perspective view of a corner insertion leg piece.

The corner insertion leg piece 5 shown in FIG. 7 is used in the corner section when it is needed and serves the function of the insertion leg portion. The corner insertion leg piece 5 is molded from a soft synthetic resin material which may be flexed or curved with relative ease, and comprises a corner engaging head 18 and corner recesses 19 formed below the engaging head 18 and which engage with the projections 10, respectively. Below the corner recesses 19, there is arranged a support leg 21 and a glass support piece 23 which are formed integrally. The support leg 21 is provided at its longitudinal side surface with a rainwater guide portion 22 in the form of an inclined projection strip which is inclined toward the top end of the support leg 21. At one side surface of the glass support piece 23, a glass receiving tongue 23a is provided, and a glass insertion groove 20 is formed between the glass receiving tongue 23a and the lower surface of the support leg 21 for engageably receiving the edge of the glass panel 30.

Figure 8:
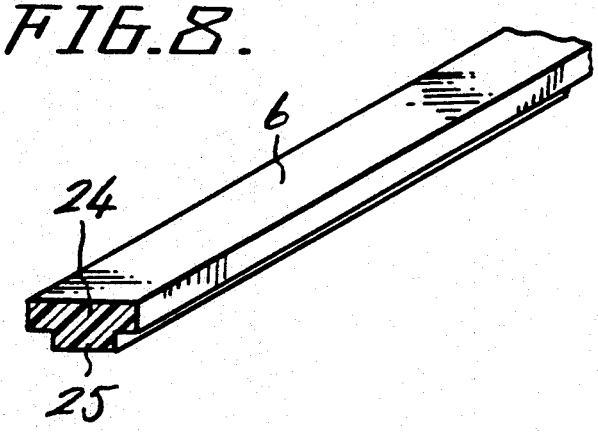
FIG. 8 is a perspective view showing one portion of a reinforcing implant piece.

FIG. 8 shows a reinforcing implant strip 6 which is used in the upper molding section 32 when the strength of the recessed groove 11 into which the head 7 portion is engaged is reduced in the upper molding section 32. The implant strip 6 comprises an embedded portion 24 formed in the same configuration as that of the engaging groove 11 in the longitudinal direction, and a stepped portion 25 formed below the embedded portion 24. The embedded portion 24 and stepped portion 25 are embedded in the engaging groove 11 and the elongated hole 9, so that the strength of the engaging groove 11 maybe maintained in the upper molding section 32.

As shown in FIG. 4 which is a cross-sectional view taken along line 4—4 of FIG. 1, the molding body 1 is secured to the body panel 31 using a spacer 37 and an adhesive 35 in the upper molding section 32 of the glass panel 30. The upper edge of the glass panel 30 is kept engaged directly with the glass insertion groove 26 of the head molding 2, such that the upper molding section 32 is formed without a rainwater guide portion.

For the right and left side molding sections 33 and 33 of the windshield glass panel 30, as shown in FIG. 5, the right and left edges of the glass panel are received in the glass insertion groove 17 of the insertion leg portion 3, and the insertion head 12 of the insertion leg portion 3 is received in and suspended form the engaging groove 11 of the head molding 2. With this configuration, the molding body 1 is fixed to and tightened against the body panel 31 using the spacer 37 and the adhesive 35, and the side molding sections 33 and 33 are provided with the rainwater guide portions 15.

FIG. 9 shows a modified embodiment of the head molding 2 shown in FIG. 2, wherein the head molding 102 of FIG. 9 comprises a head portion 107, and a vertical leg 108 provided below the head portion 107.

A longitudinally elongated hole 109 is formed in the lower surface of the head portion 107, engaging projections 110 are formed on opposing sides of the elongated hole 109, and an engaging groove 111 is formed in the interior of the head portion 107 in communication with the elongated hole 109.

The vertical leg 108 is provided at its one side with a glass insertion groove 126, and at its lower end with a bent engaging piece 125 which is caused to flex in a downward direction. An auxiliary support piece 108a is projected from the lower end of the other side of the vertical leg 108.

FIG. 10 shows an alternative embodiment of the insertion leg portion 3 as shown in FIG. 3, wherein an insertion leg portion 103 is provided with an insertion head 112 which is received in the insertion groove 111 defined in the head portion 107, and the insertion head 112 is shaped complementary to the groove 111. Below the insertion head 112, engaging recesses 113 are formed for receiving the engaging projections 110, and a support leg 114 and a glass support piece 116 are integrally formed. A rainwater guide portion 115 is defined in one side surface of the support leg 114 and is inclined substantially in an arch configuration so as to allow the rainwater to drop downwardly therealong. An engaging projection 114a and an engaging recess 114b are formed at the lower portion of the support leg 114 on a side thereof opposite the rainwater guide portion 115. A glass receiving tongue 129 is provided at the lower end of a glass support piece 116 and is projected to one side thereof to form a glass insertion groove 117 between the glass receiving tongue 129 and the lower surface of the support leg 114.

Figure 13:
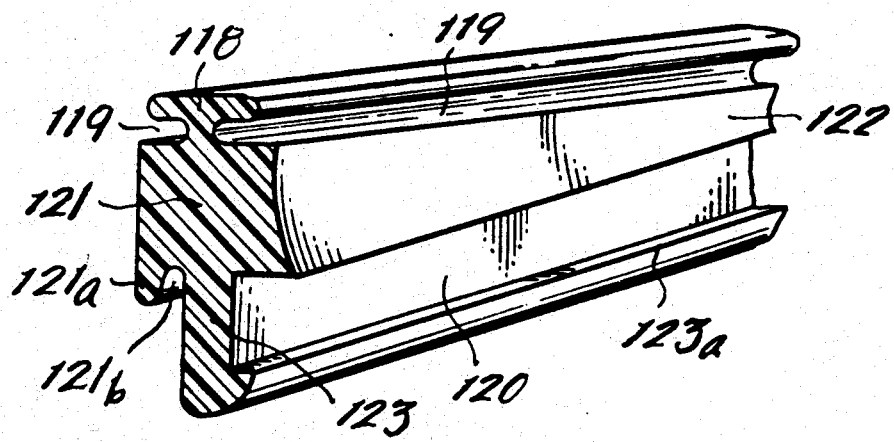
FIG. 13 is a perspective view showing a further alternative embodiment of the corner insertion leg piece of FIG. 7; and, FIG. 14 is a longitudinal cross-sectional view showing a further alternative embodiment of the decorative head portion.

Shown in FIG. 13 is an alternative embodiment of the corner insertion leg piece 5 of FIG. 7 to be used at the corner molding sections if necessary. The leg piece serves as the insertion leg portion. The leg piece is formed of a relatively soft material such as a soft synthetic resin which may be flexed or curved relatively easily. A corner engaging head 118 is provided at an upper portion of the leg piece, and corner recesses 119 are formed below the corner engaging head 118. The corner recesses 119 are engaged with the engaging projections 110. A support leg 121 and glass support piece 123 are integrally formed below the corner recesses 119. The support leg 121 is formed with a rainwater guide portion 122 which is inclined in an arch-shape with a width dimension which decreases progressively along the longitudinal direction. A lower end of one side of the glass support piece 123 is provided with a glass receiving tongue 123a, and a glass insertion groove 120 is formed between the glass receiving tongue 123a and the undersurface of the support leg 121. The insertion groove 120 is engageable by the edge of the glass panel 30. At the rear surface of the support leg 121, the engaging projection 121a and the engaging recess 121a are formed for engagement with an engaging piece 125a.

Figure 14:
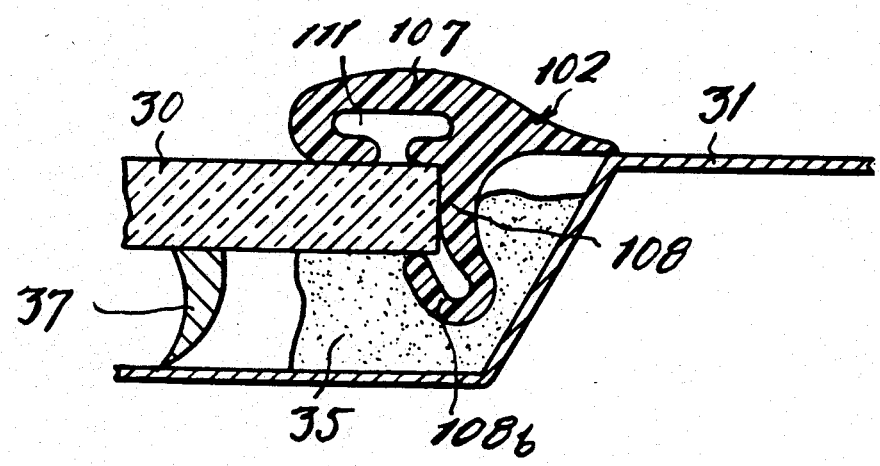

As shown in FIG. 14, the head portion 107 is provided with a bent leg portion 108a formed by folding the lower portion of the vertical leg 108 toward the side direction. The bent leg portion 108a serves to increase the adhesion area over which the adhesive 35 is applied, and thereby improves the adhesion strength of the glass panel 30 relative to the body panel 31.

At the right and left side molding sections 33 and 33 of the windshield glass panel 30, the upper insertion head 112 of the insertion leg portion 103 is inserted into the engaging groove 11 in the interior of the head portion 107 as shown in FIG. 11; and the engaging projection 114a formed on one side of the support leg 114 is inserted into the engaging recess 125a defined in the lower portion of the vertical leg 108. Thus, the rainwater guide portion 115 is provided at the upper portion of the molding body, and the opposite side edge of the glass panel 30 is inserted into the lower glass insertion groove 117, whereby the molding body is fixed by the adhesive 35 in position in the body panel 31.

Figure 12:
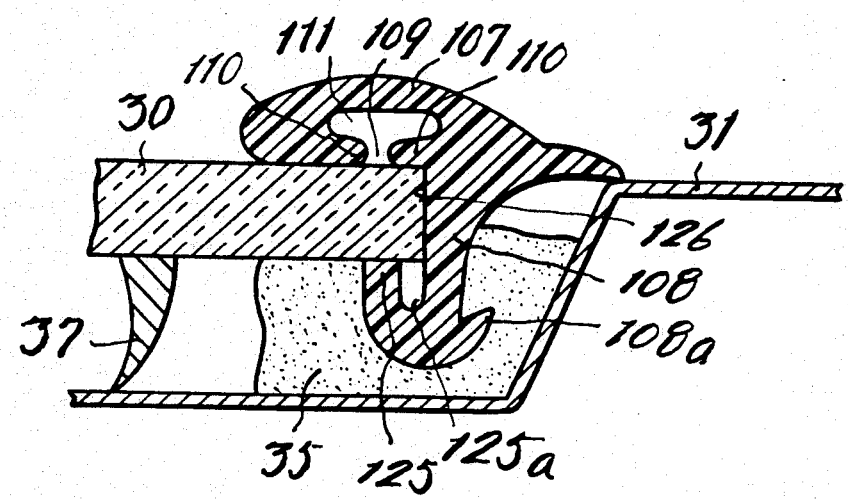
FIG. 12 is an enlarged cross-sectional view similar to FIG. 4, but showing the decorative head portion of FIG. 9.

At the upper molding section 32 of the glass panel 30, the upper edge of the glass panel 30 is inserted into the glass insertion groove 126 of the head molding 102 as shown in FIG. 12, and the molding body 1 is fixed by the adhesive 35 in position between the glass panel 30 and the body panel 31. Thereby, an upper molding section 32 of the molding body 1 is formed without the rainwater guide portion.

In accordance with the molding body of the present invention, two types of members, i.e., the head molding and the insertion leg portion, are utilized to integrally form the right and left side molding sections having right and left rainwater guide portions and an upper molding section without an upper rainwater guide portion. Thus, it is possible to eliminate the drawback of the prior art that the strength of the molding body is poor, because the molding body is formed with a head and leg in one united body. Simultaneously, it is possible to afford a further advantage in that the right and left side molding sections, which are likely to receive pressure due to the wind and rain during travel, may be fixed rigidly. The head molding may be used in the upper molding section in the same configuration as in the side molding sections, and the corner portion may be finished to provided an improved aesthetical appearance by using a soft synthetic resin material such that the corner portion may be bent without interruption. Furthermore, because an elongated hold and an engaging groove are formed in the undersurface and the interior of the molding head, the upper portion of the insertion leg portion can form the insertion head in configuration complementary to that of the engaging groove. Consequently, the insertion leg portion can be freely engaged and fixed in position from the side without inconvenience, to thereby prevent its inadvertent detachment from the groove.

Furthermore, since the head molding and the vertical leg portion are formed in the generally L-shaped cross-sectional configuration, the insertion leg portion may be positively supported in position, thus providing it with sufficient rigidity.

The insertion leg portion is formed integrally with the upper head portion, the lower support leg and the glass support piece, and consequently a relatively soft synthetic resin may be suitably selected for the right and left side molding sections in applications where an increased strength is required, and the rainwater guide portion can be formed to allow for free selection of its height and depth dimensions so as to be engaged with the glass panel.

Additionally, the glass insertion groove, which is formed below the rainwater guide portion, is formed integrally with the support leg, and so it is greatly reinforced and allowed to pinch the top end of the glass panel in a stable manner. Moreover, the reinforcing implant piece which is received in the engaging groove in the head molding may serve to prevent the flexure, etc., of the molding head portion under a possible pressure to be imposed upon the molding head portion, while assuring the positive and reliable location of the glass panel in position.

Finally, since the vertical leg is provided at its lower end with the bent engaging piece and the resultant engaging recess is engaged by the engaging projection of the insertion leg at its lower portion, inadvertent detachment of the insertion leg from the molding head may be avoided.

What is claimed:

1. A synthetic resin windshield glass molding including an upper molding section for use along an upper section of a vehicle windshield glass and side molding sections for use along opposing side sections of the vehicle windshield glass, respectively, said windshield glass molding comprising:

a head molding including a head portion and a leg portion extending downwardly from said head portion;

an insertion leg portion including an insertion head, a supporting leg depending from said insertion head, a rainwater guide portion formed in an inner side of said supporting leg, and a glass supporting piece depending from said supporting leg and having a glass insertion groove formed in an inner side thereof;

wherein an elongated hole is formed in a lower surface of said head portion of said head molding, engaging projection are formed on opposing sides of said elongated hole, and an engaging groove is formed in said head portion in communication with said elongated hole for engageably receiving said insertion head of said insertion leg portion;

wherein said leg portion of said head molding is provided, at an inner side thereof, with a glass receiving tongue at a lower end of said leg portion, such that a glass receiving groove is formed between said head portion and said glass receiving tongue;

wherein, in said upper molding section, said glass receiving groove of said leg portion of said head molding is adapted to receive an upper edge of the vehicle windshield glass; and wherein, in each of said side molding sections, said insertion head of said insertion leg portion is engaged in said engaging groove of said head portion of said head molding, and said glass receiving groove of said glass supporting piece of said insertion leg portion is adapted to receive a side edge of the vehicle windshield glass.

2. A synthetic resin windshield glass molding as recited in claim 1, further comprising a reinforcing implant piece inserted in said engaging groove of said head portion of said head molding in said upper molding section.

3. A synthetic resin windshield glass molding as recited in claim 1, wherein said glass receiving tongue is defined by an inwardly curved bent portion of said lower end of said leg portion of said head molding; and an engaging portion is provided on an outer side of said supporting leg of said leg insertion portion for engagement with said glass receiving tongue of said leg portion of said head molding, in said side molding sections.

* * * * *